United States Patent
Roeglin et al.

(10) Patent No.: US 9,067,517 B1
(45) Date of Patent: Jun. 30, 2015

(54) CANTILEVERED VEHICULAR SEAT WITH FORCE DISTRIBUTING LOCKS

(71) Applicant: ATWOOD MOBILE PRODUCTS, LLC, Elkhart, IN (US)

(72) Inventors: Timothy Roeglin, Elkhart, IN (US); Hari Sunkara, Elkhart, IN (US)

(73) Assignee: Dometic Sweden AB, Solna (SE)

( * ) Notice: Subject to any disclaimer, the term of this patent is extended or adjusted under 35 U.S.C. 154(b) by 174 days.

(21) Appl. No.: 13/986,092

(22) Filed: Mar. 29, 2013

Related U.S. Application Data

(60) Provisional application No. 61/618,293, filed on Mar. 30, 2012.

(51) Int. Cl.
| | |
|---|---|
| *B60N 2/10* | (2006.01) |
| *B60N 2/04* | (2006.01) |
| *B60N 2/02* | (2006.01) |
| *B60N 2/433* | (2006.01) |
| *B60N 2/30* | (2006.01) |
| *B60N 2/36* | (2006.01) |

(52) U.S. Cl.
CPC .............. *B60N 2/433* (2013.01); *B60N 2/3002* (2013.01); *B60N 2/3038* (2013.01); *B60N 2/36* (2013.01); *B60N 2/3045* (2013.01); *B60N 2/3011* (2013.01)

(58) Field of Classification Search
CPC .... B60N 2/3011; B60N 2/305; B60N 2/3043; B60N 2/3013; B60N 2/36; B60N 2/433; B60N 2/3002; B60N 2/3038; B60N 2/3045
USPC ........................ 297/14, 326, 331, 335, 378.12
See application file for complete search history.

(56) References Cited

U.S. PATENT DOCUMENTS

| | | | | |
|---|---|---|---|---|
| 855,125 | A | * | 5/1907 | Nolan ............................ 297/315 |
| 5,489,141 | A | * | 2/1996 | Strausbaugh et al. ......... 297/335 |
| 5,492,389 | A | | 2/1996 | McClintock et al. |
| 6,106,066 | A | | 8/2000 | Moffa et al. |
| 6,846,044 | B2 | | 1/2005 | Moffa et al. |
| 6,974,184 | B1 | | 12/2005 | Moffa et al. |
| D521,756 | S | | 5/2006 | Moffa et al. |
| 7,438,354 | B2 | | 10/2008 | Moffa et al. |
| 8,360,528 | B2 | * | 1/2013 | Shinohara ................. 297/378.12 |
| 2003/0184129 | A1 | * | 10/2003 | Honda et al. ..................... 297/14 |
| 2004/0189077 | A1 | * | 9/2004 | Moffa et al. .............. 297/452.39 |
| 2005/0269842 | A1 | * | 12/2005 | Braun .............................. 297/14 |

* cited by examiner

*Primary Examiner* — Milton Nelson, Jr.
(74) *Attorney, Agent, or Firm* — Middleton Reutlinger

(57) ABSTRACT

A cantilevered vehicular seat with force distributing locks is disclosed. The seat is connectable to a support by linkage so the seat is movable relative to the support between a vertical stowable position and a horizontal position. The seat back is pivotally secured to the seat so that it is movable relative to the seat between a lowered position and a raised position. A self-locking pin lock and slot assembly releasably secures the seat back in the raised position when it is unfolded to distribute loads and make the seat sturdier. The pin lock and slot assembly has pivot arms secured to the ends of the seat at respective pivots. The arms operate the folding of the seat back relative to the seat. Slots formed in the seat back receive a retention pin and a lock pin carried by the pivot arms. The retention pin extends the length of the seat to reduce seat back chucking and distribute load to the vehicle. Another latch/lock assembly releasably self-locks the seat in the horizontal position. A self-locking fastener conveniently secures the seat in the vertical position when not in use.

12 Claims, 10 Drawing Sheets

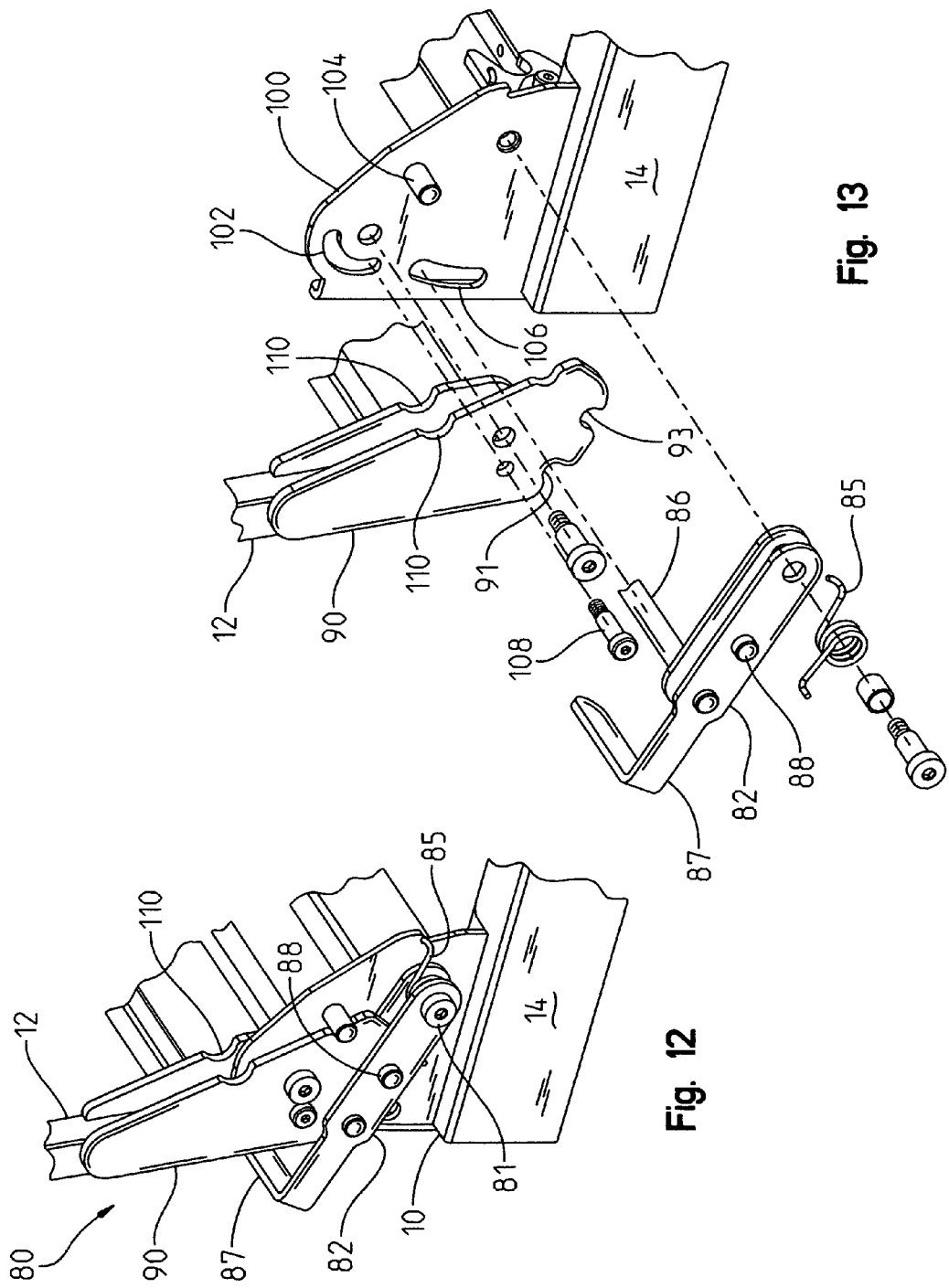

CANTILEVERED VEHICULAR SEAT WITH FORCE DISTRIBUTING LOCKS

REFERENCE TO RELATED APPLICATION

This application claims priority to U.S. Provisional Application No. 61/618,293 filed Mar. 30, 2012, which is hereby incorporated by reference.

BACKGROUND OF THE INVENTION

The invention relates generally to cantilevered seats and, more particularly, to a cantilevered vehicular seat with force distributing locks.

Cantilevered seats, tables and benches are known. Innovators employ the cantilever in combination with linkage, hinges and other space-saving articles with both form and function in mind. In one design, which is useful in a vehicle, aircraft, or RV, for example, the seat back folds on top of the seat bottom and the two may be lifted upward and stowed in a vertical position. A unique problem is presented, however, by the crash force absorption and seat belt anchor requirements of governing regulations and standards of the National Highway Traffic Safety Administration (NHTSA) (49 CFR §§571.207-571.210), which are incorporated herein by reference. It is a problem because of the desirability to use cantilevered seats in specialty vehicles, trucks and vans where space is a commodity. A fold-up seat can be stowed when not in use to make room for a wheel chair, for example.

The lap and shoulder belt anchors for these seats must also be purposefully positioned on the seat frame to insure effective occupant restraint. The administrative regulations require it. One can appreciate the torsion and other unique load forces displaced on a cantilevered seat containing a belted occupant during a collision. In addition to meeting applicable strength and load requirements, it would be advantageous if the locks and assemblies that secure the seat back, and which permit the stowing function of the seat, did not disengage, loosen, or permit parts to move when seriously stressed.

Thus, it would be advantageous to provide an improved cantilevered seat with force distributing locks. Besides the space saving function, such a seat that meets NHTSA crash force absorption and seat belt anchor requirements for the protection of vehicle occupants in crashes would be especially desirable.

SUMMARY OF THE INVENTION

The present invention relates to a cantilevered seat with force distributing locks that are self-locking. The cantilevered seat includes a seat with a support end and an open end. Linkage is connected to the support end so the seat is pivotally movable relative to the support between a vertical stowable position and a horizontal position. A seat back is provided with opposite ends. The seat back is pivotally secured to the seat so that the seat back is movable relative to the seat between a lowered position and a raised position. A pin lock and slot assembly releasably secures the seat back in the raised position and handles the load that may be exerted on the seat in various collision scenarios, including vehicular crash conditions. The pin lock and slot assembly is operated by pivot arms secured to the ends of the seat at a pivot. Load force is distributed along the length of the seat by a retention pin, and a lock pin strengthens the structure. Retention slots located at each end of the seat back receive the retention pin. The retention pin is a single pin or bar, and it extends through cutouts formed in the ends of the seat and connects the ends of the seat back.

In another aspect of the invention, a unique latch and lock assembly carried by the seat is adapted for releasably securing the seat in a horizontal position once the seat is folded down from the vertical position. The latch and lock are mounted to the seat at a respective pivot. The latch and the latch lock cooperate to define a self-locking function. Each is biased, respectively, by a spring for rotational movement in a direction that opposes the direction of the other. The latch has an edge with shaped portions for engagement with legs of the latch lock. The latch has a slot for retaining a link head portion of a link in the linkage.

One object of the invention is to provide an improved cantilevered seat with force distributing locks at the seat back that reduce back chucking and distribute load forces to the vehicle in vehicular crash scenarios. Related objects and advantages of the present invention will be apparent from the following description.

BRIEF DESCRIPTION OF THE DRAWINGS

The details of the invention, both as to its structure and operation, may be obtained by a review of the accompanying drawings, in which:

FIG. 12 is a cutaway enlarged isometric view of the pin lock and slot assembly of the invention shown from the open end of the cantilevered seat;

FIG. 13 is a cutaway enlarged isometric view of the pin lock and slot assembly of the open end of the cantilevered seat shown disassembled;

DETAILED DESCRIPTION OF INVENTION

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

Figure 1:
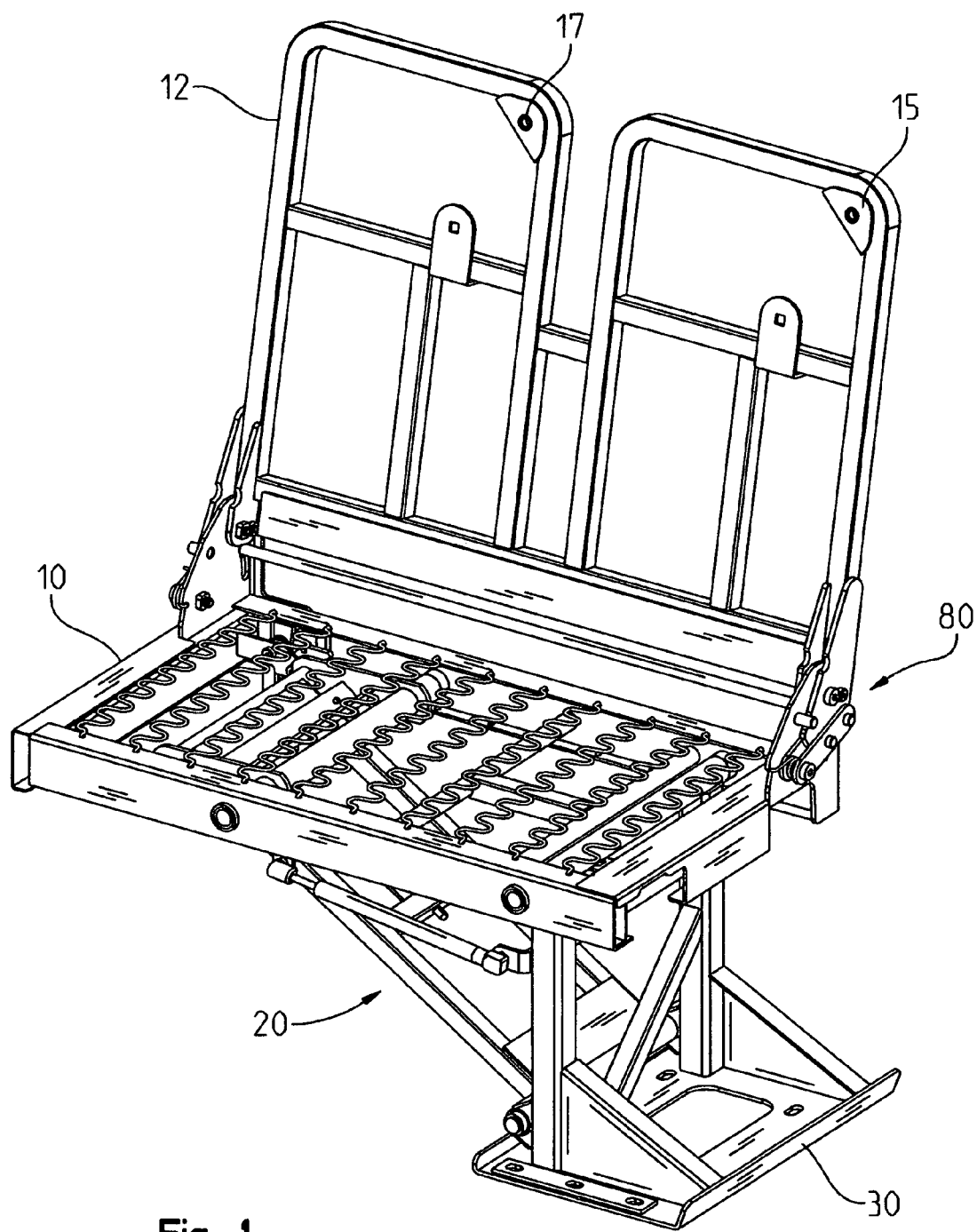
FIG. 1 is an isometric view of the cantilevered seat of the invention in its fully unfolded horizontal position with the seat back in the raised position.
Figure 6:
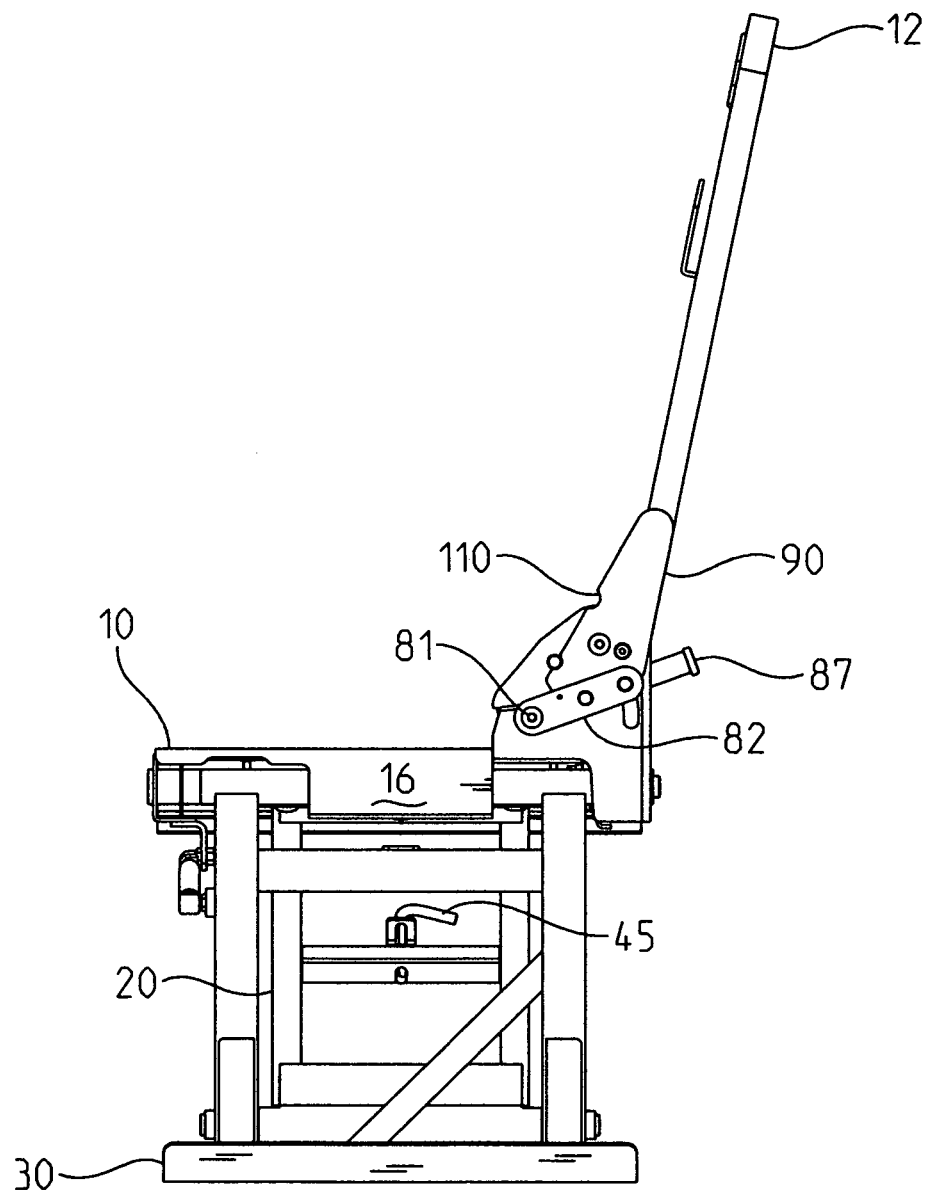
FIG. 6 is a side plan view of the support end of the cantilevered seat in the horizontal position with the seat back in the raised position.
Figure 8:
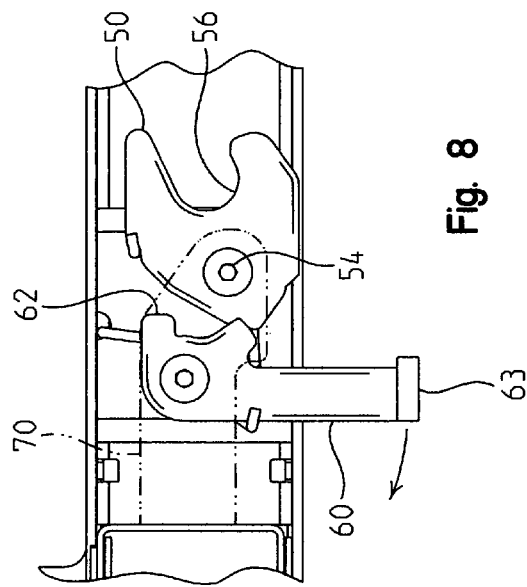
FIG. 8 is a side plan cutaway view of the latch and lock of the invention shown locked. The arm is shown transparent for viewing the latch and lock.

Referring to the figures, the cantilevered seat 10 has an open end 14 and a support end 16. A base member 30 may be included for attaching the support end 16 to any support, such as the floorboard of a vehicle, aircraft, RV, boat, a building structure or other application. In other embodiments, the base member 30 is not necessary, and the seat may be adapted for directly securing to a wall, building structure or other support using known means. The seat 10 includes a seat back 12 with seat belt anchorages 15 with holes 17 threaded to accept bolts. The seat back 12 is pivotally secured to the seat 10 so that the seat back is movable relative to the seat and may be folded between a lowered position (FIG. 4) and a raised position where an occupant would be supported (FIGS. 1 and 6).

Figure 2:
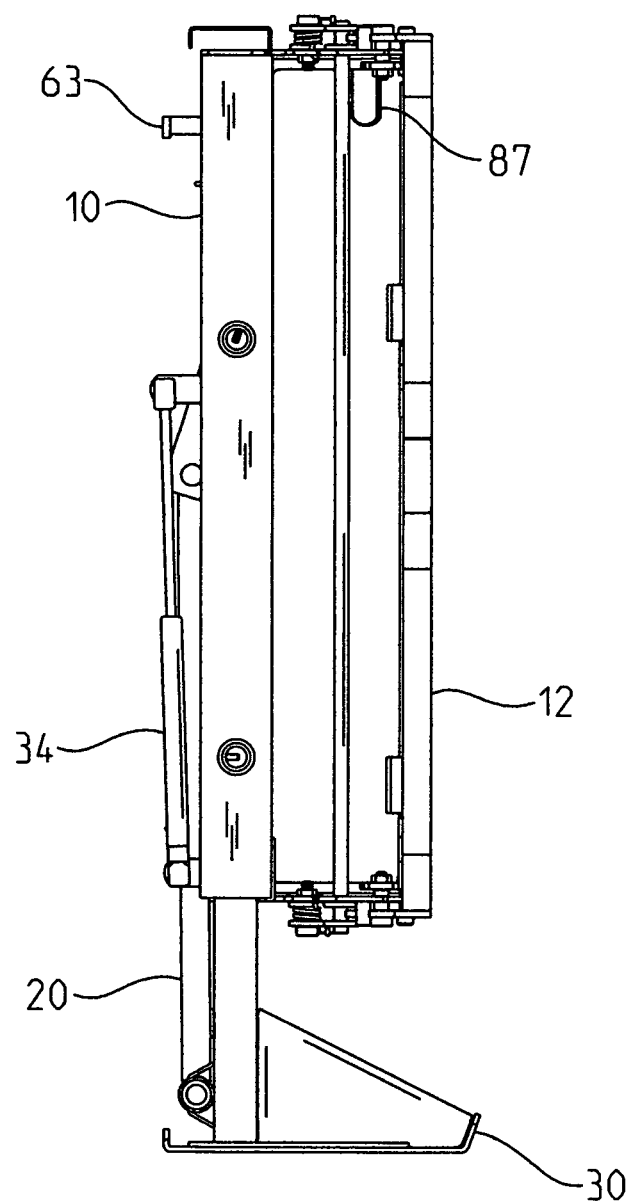
FIG. 2 is a side plan view of the cantilevered seat in the vertical stowable position.
Figure 4:
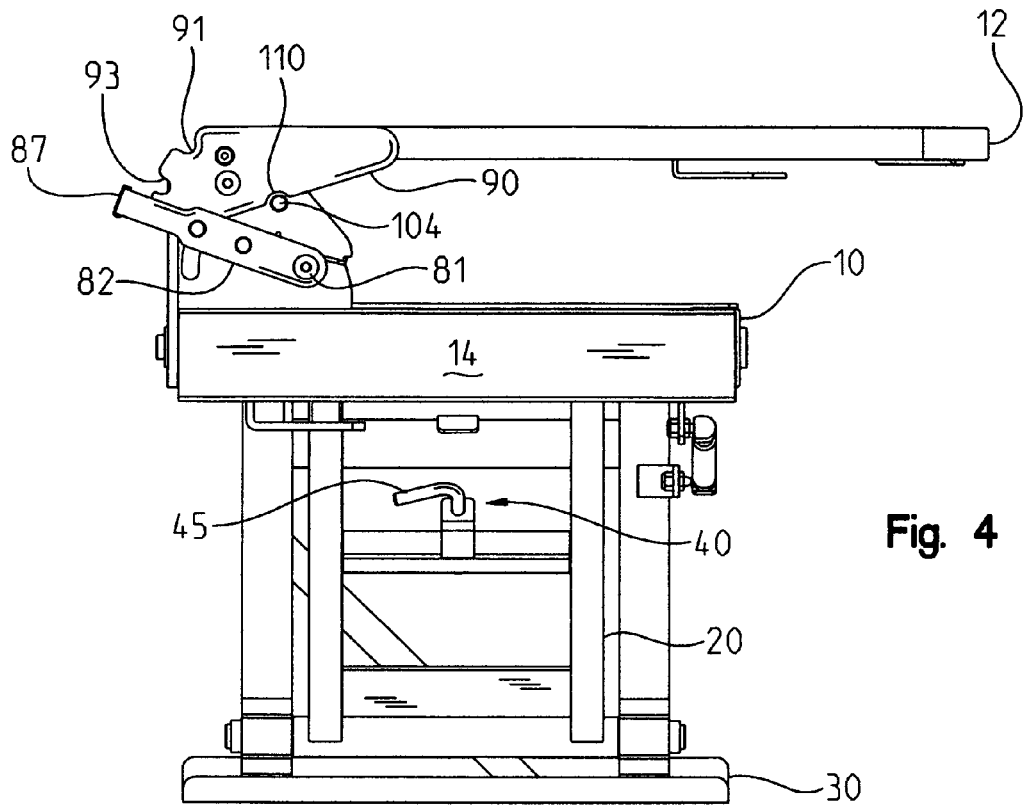
FIG. 4 is a side plan view of the open end of the cantilevered seat shown in the horizontal position with the seat back in the lowered position.

In one embodiment, linkage 20 pivotally connects the support end 16 to the base member 30. The seat 10 is thus movable relative to the base member 30, or other support, between a vertical stowable position (FIG. 2) and a horizontal position (FIG. 4). In that embodiment, the base member 30 is adapted for anchoring to a support, such as a vehicle floorboard (not shown). All components of the cantilevered seat are formed from a rigid sturdy material, preferably steel. The belt anchorages 15 are connected to material whose breaking strength is equal to or greater than the breaking strength of the webbing for the seat belt assembly installed as original equipment. The attachment hardware used is known in the field.

Figure 5:
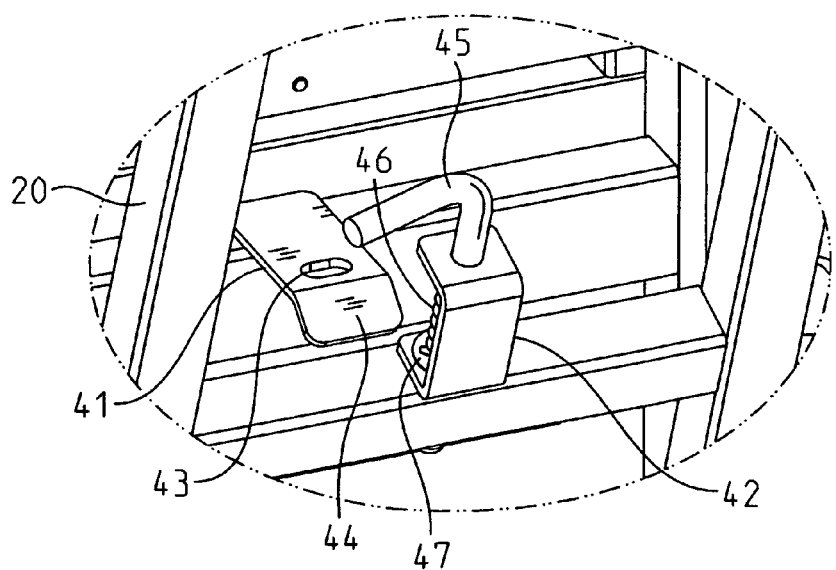
FIG. 5 is a cutaway isometric view of the underside of the seat highlighting the fastener of the invention.

Referring to FIGS. 4-5, the cantilevered seat includes a fastener 40 for releasably securing the linkage 20 and the base member 30 together so the seat 10 and seat back 12 when folded together may be releasably secured in the vertical position. Skilled artisans should recognize that numerous types of fasteners may be used to releasably secure the seat in the position illustrated in FIG. 2. The Applicants have found the self-locking fastener described below preferable since it need only be manipulated by hand upon its release. In the embodiment illustrated in FIG. 5, the fastener 40 includes a tab 41 having a bore 43 formed therein for receiving a bolt 45. In one embodiment, the linkage 20 connecting the seat 10 and the base member 30 carries the bolt 45.

Figure 3:
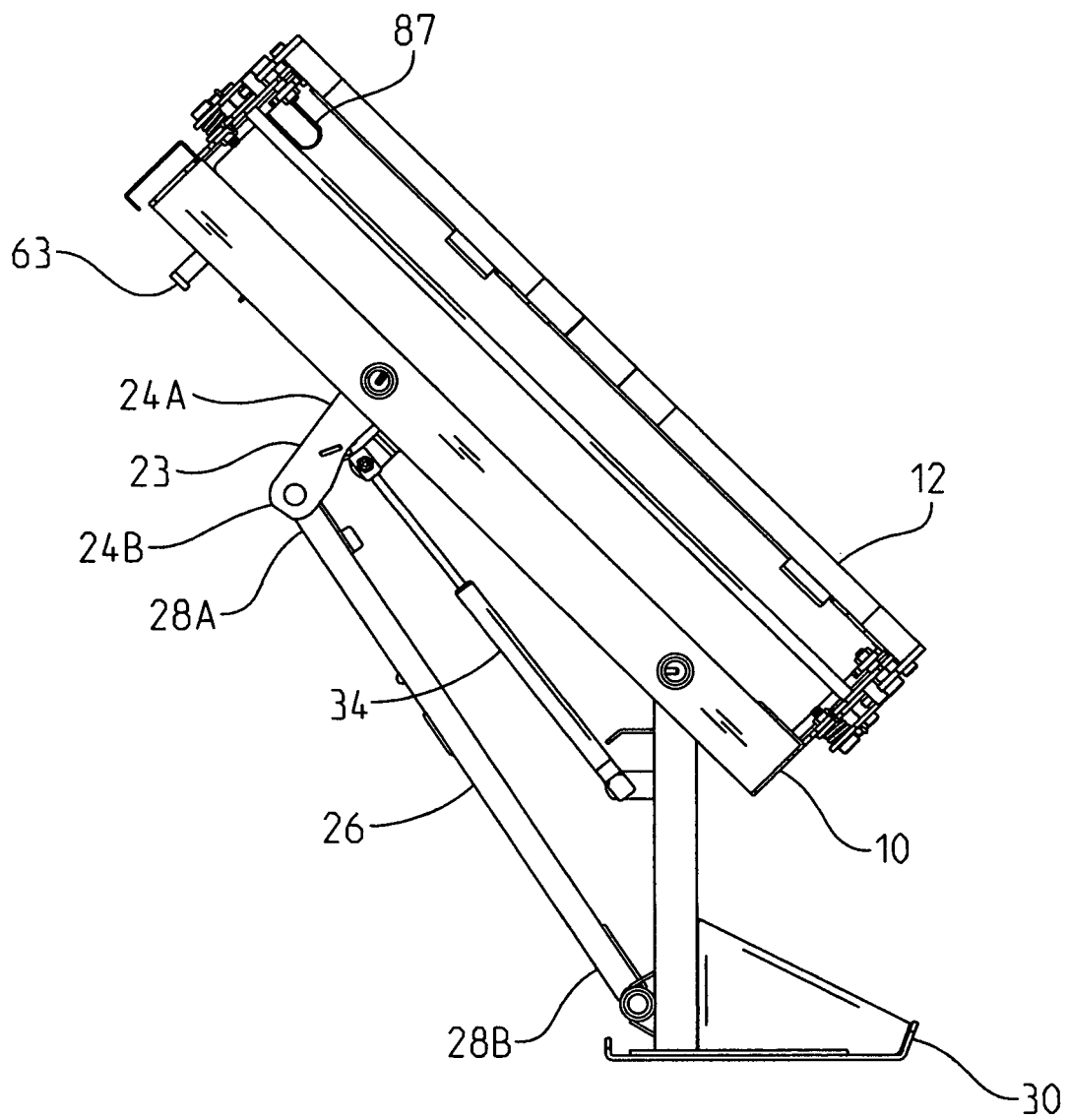
FIG. 3 is a side plan view of the cantilevered seat between the vertical and horizontal positions.

The bolt 45 is contained in a clip 42 and made to move up and down in response to engagement with the sloped surface 44 of the tab 41. A spring 46 surrounding the bolt seats at one end on an annular shelf 47 on the bolt's shaft and contacts the roof of the clip 42 at its other end to constantly urge the bolt 45 in a downward direction. In one embodiment, the tab 41 is secured to the base member 30. Referring to FIG. 3, an adjustable counter balance device, such as a spring (not shown) or piston and cylinder unit 34, may be operatively connected between the base member 30 and seat to lighten the weight born by a user after releasing the bolt from the bore 43 when lowering the seat. The cylinder unit 34 helps to raise the seat into the vertical position as well.

Linkage 20, like that shown in FIG. 3, may be provided and include a first link 23 with two ends 24A, 24B, and a second link 26 with two ends 28A, 28B. The first link 23 may be pivotally connected underneath the seat frame at one of the ends 24A and pivotally connected to one end 28A of the second link at its other end 24B. The other end 28B of the second link may be pivotally connected to the base member 30. In other embodiments, the seat may be with or without base member 30 or linkage 20 and adapted using known means for attaching to numerous types of supporting structures/applications, including the ground surface, building structures, aircraft, train compartments and vehicles.

Figure 7:
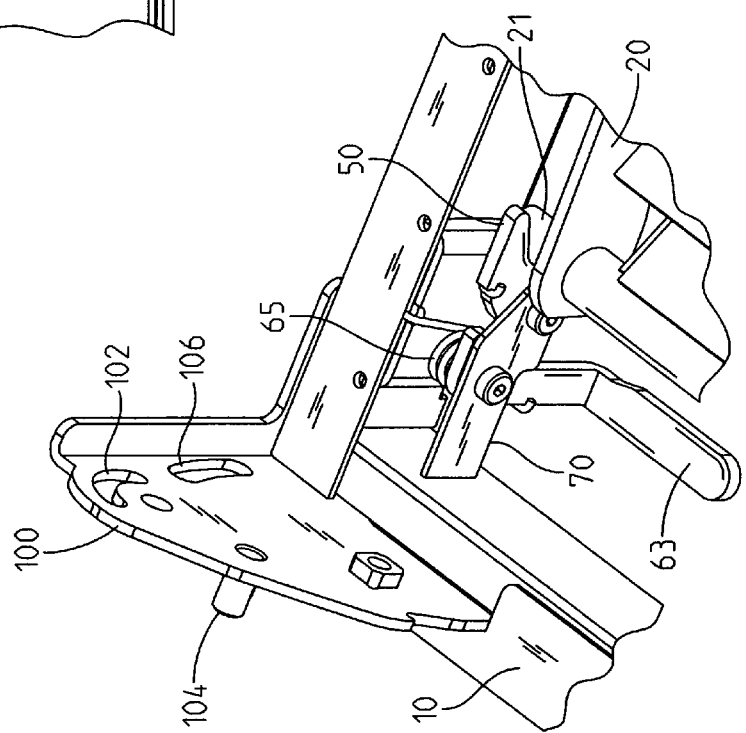
FIG. 7 is a cutaway enlarged top-downward perspective view of the seat showing the latch and lock of the invention with the link head portion of linkage locked in the latch.
Figure 10:
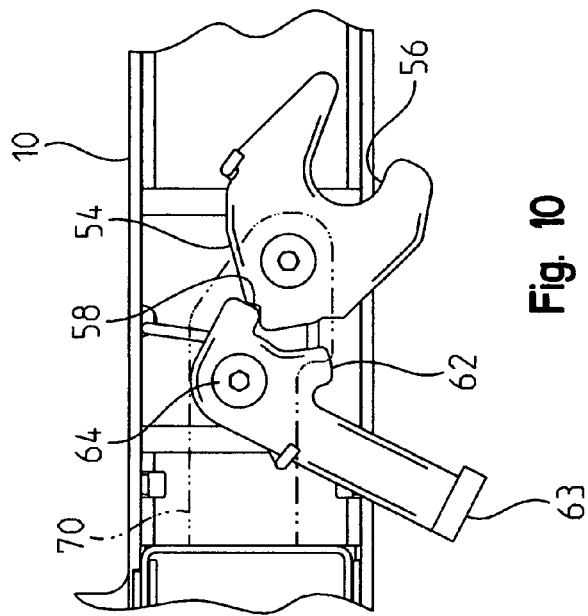
FIG. 10 is a side plan cutaway view of the latch and lock of the invention shown unlocked. The arm is shown transparent for viewing the latch and lock.
Figure 9:
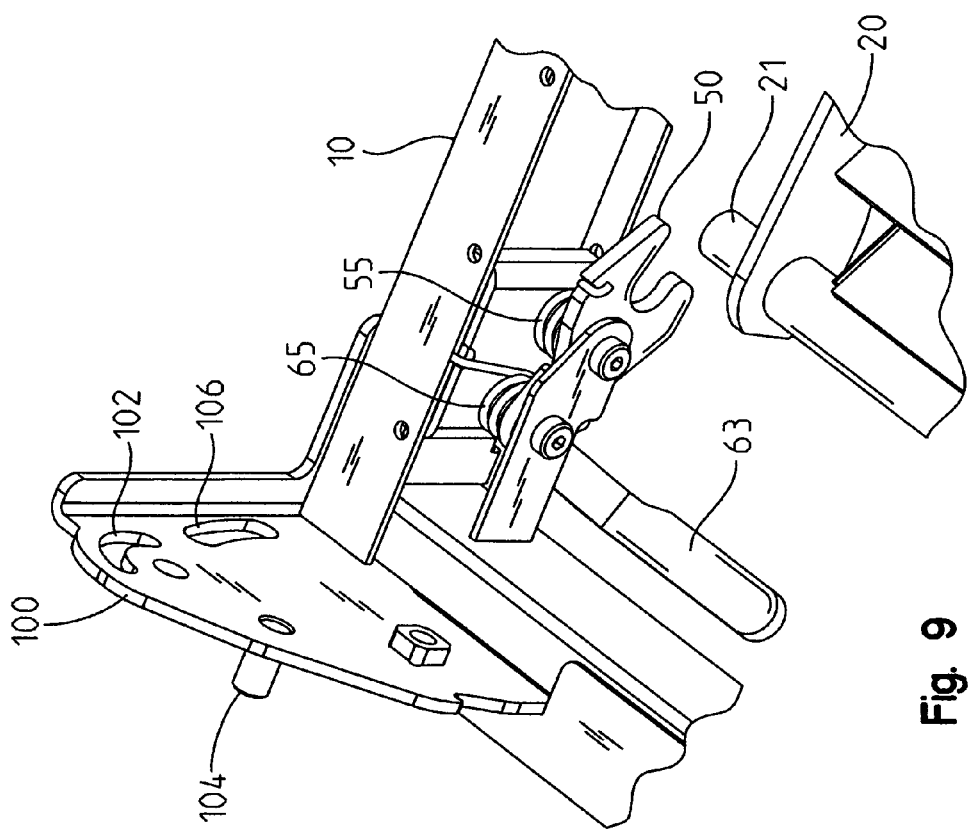
FIG. 9 is a cutaway enlarged isometric view similar to that of FIG. 7 showing the link head portion unlatched.
Figure 11:
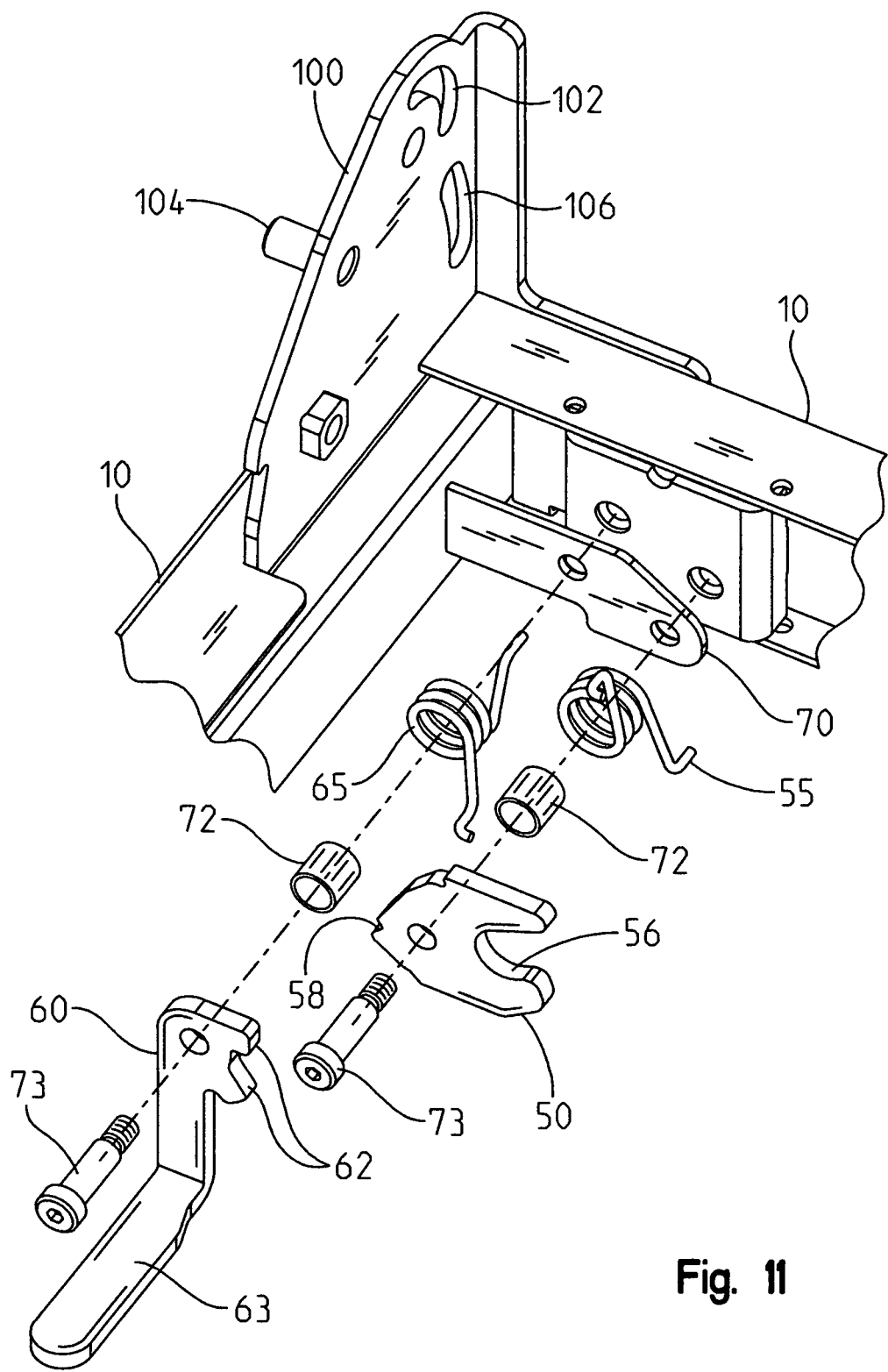
FIG. 11 is a cutaway enlarged isometric view of the latch and lock assembly shown disassembled.

With reference to FIGS. 7-11, a latch 50 is carried by the seat frame and includes a lock 60 for releasably securing the seat 10 in the horizontal position. The latch 50 and the latch lock 60 are each secured to the inside wall of the seat, respectively, by an arm 70 at pivots 54, 64 and adapted for self-locking operation. The latch and the latch lock are biased, respectively, in rotatably opposing directions by springs 55, 65. The springs 55, 65 are threaded by sleeves 72 and secured to the arm 70 with bolts 73, as shown in FIG. 11. In one embodiment, the latch has an edge 54 with shaped portions 58 for engagement with legs 62 of the latch lock 60. The latch 50 has a slot 56 for retaining a link head portion 21 of a link in the linkage 20. As the seat is lowered from the vertical to the horizontal position, the link head 21 at the end 28A of linkage 20 engages the slot 56, as shown in FIG. 7. As a result, the latch and the lock rotate in opposite directions. Spring 65 urges the lock to rotate until legs 62 contact shaped portions 58 to secure the seat. The seat is raised by depressing lock handle 63 in the direction of the arrow in FIG. 8 thus permitting spring 55 to rotate latch 50 forward (clockwise) releasing link head 21 from latch slot 56.

Referring to FIGS. 12-14B, a self-locking pin lock and slot assembly 80 releasably secures the seat back 12 in the raised position. In an embodiment, the pin lock and slot assembly 80 includes a pivot arm 82 secured to each side of the seat at a pivot 81. Each of the arms includes a retention pin 86 and a lock pin 88. A seat back locking plate 90 is secured at each end of the seat back. Each of the locking plates 90 has a retention slot 91 for receiving the retention pin 86 and a latch slot 93 for receiving the lock pin 88 for locking the seat back 30 in the raised position, as shown in FIG. 14A.

In one embodiment, biasing means, preferably a spring 85, is operatively associated with each pivot arm 82 for constantly biasing the arm in a rotationally upward direction relative to the seat 10. The arm 82 at the open end 14 of the seat includes a handle 87 at the end opposite pivot 81, as best shown in FIGS. 12-13. The handle 87 effects operation of the pivot arms 82 to release the seat back 12 so it can be placed into the lowered position.

Figure 14B:
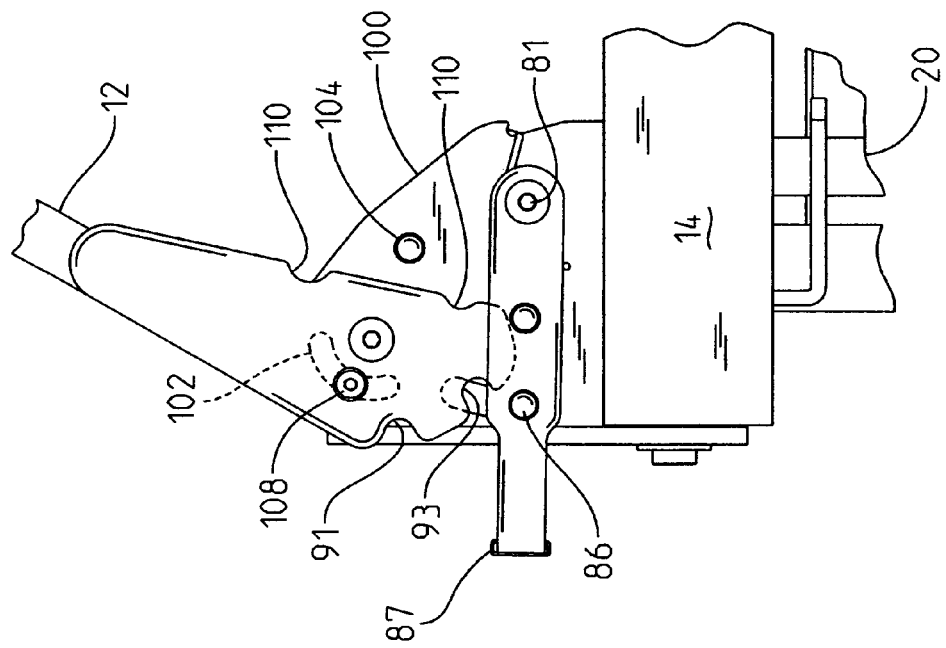
FIG. 14B is a side plan view of the open end of the cantilevered seat showing the pivot arm displaced downward permitting movement of the seat back toward the lowered position.
Figure 14A:
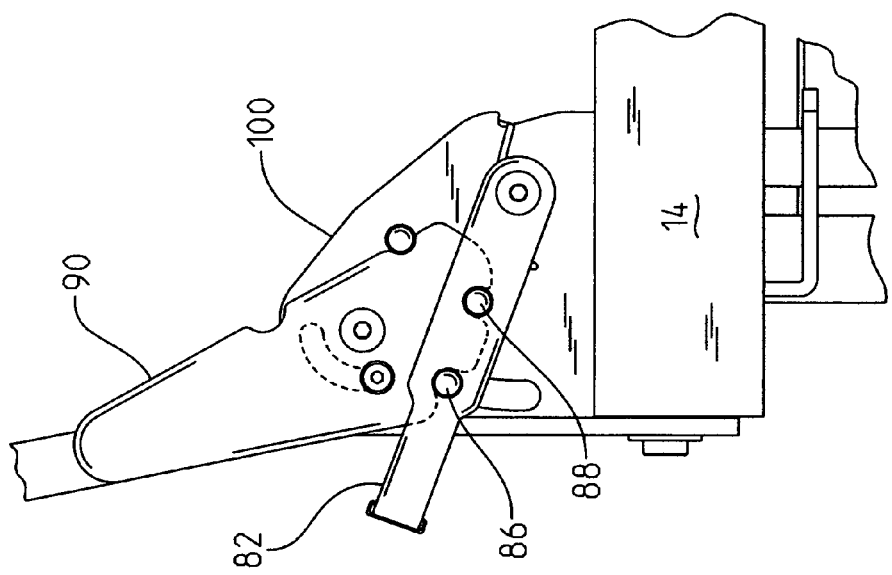
FIG. 14A is a side plan view of the open end of the cantilevered seat showing the seat back locked in the raised position.

In one embodiment, the pin lock and slot assembly 80 includes a frame plate 100 having an upper cam slot 102 formed in the plate, as shown in FIGS. 14A-14B. A cam pin 108 carried by the seat back locking plate 90 travels within the cam slot 102 when the seat back moves between the lowered and raised positions. The spring 85 urges the arm 82 with retention pin 86 and lock pin 88 against the slots 91, 93, respectively, thus self-locking the seat back 12 in the raised position (FIG. 14A). A lower cutout 106 formed in the frame plate 100 permits travel of the retention pin 86 when the pivot arms 82 are rotated downward in a direction opposite to which the spring 85 urges. That is how the seat back 12 may be moved toward and into the lowered position, as illustrated in FIG. 14B.

In the preferred embodiment, the retention pin 86 is a single pin or bar, and it extends through cutouts 106 formed in the ends of the seat and connects the ends of the seat back 12. The single pin structure has been found especially effective at distributing to the vehicle the load force absorbed by the seat in crash testing. The frame plate 100 has a stop 104 against which portions 110 of the seat back locking plate 90 abut when the seat back 12 is in the lowered position and in the raised position.

The pin lock and slot assembly 80 and the latch 50 and the latch lock 60 are contemplated for use separate and apart from the cantilevered seat described. In the embodiment illustrated, however, the pin lock and slot assembly 80 distributes the load force in vehicular crashes from the seat to the vehicle. As a result, NHTSA regulations and standards for the protection of vehicle occupants in crashes are met. Additionally, the latch 50 and lock 60 releasably secure the seat in the horizontal position so that it does not disengage, loosen, or permit parts to move when seriously stressed. The fastener 40 self-locks the seat safely in the vertical stowable position when not in use.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Thus, it is understood that it is desirable to protect all the changes and modifications that come within the spirit of the invention.

The invention claimed is:

1. A cantilevered seat comprising:
   a seat with a support end and an open end;
   linkage for pivotally connecting the support end of the seat to a support, wherein said seat is movable relative to the support between a vertical stowable position and a horizontal position;
   a seat back pivotally secured to the seat so that the seat back is movable relative to the seat between a lowered position and a raised position;
   a pin lock and slot assembly for releasably securing the seat back in the raised position, said pin lock and slot assembly comprising pivot arms secured to the open end and to the support end of the seat at respective pivots, said pivot arm at the open end includes a handle opposite its corresponding pivot, a retention pin and a lock pin;
   a seat back locking plate secured at each end of the seat back, each of the locking plates having a retention slot for receiving the retention pin, and a latch slot for receiving said lock pin for securing the seat back in said raised position, the pivot arm at the open end having a spring for constantly biasing the pivot arm in a rotationally upward direction relative to the seat; and
   a frame plate having an upper cam slot formed in the plate, a cam pin carried by the seat back locking plate travels within the cam slot when the seat back moves between said lowered and raised positions, and a lower cutout formed in the frame plate that permits travel of the retention pin when the pivot arms are rotated downward in a direction opposite to which said spring urges, said frame plate has a stop against which portions of said seat back locking plate abut when the seat back is in said lowered position and in said raised position.

2. A cantilevered seat according to claim 1, wherein the seat further comprising, a fastener for releasably securing the seat and the support together so the seat may be stowed in said vertical position.

3. A seat according to claim 2, further comprising a latch carried by said seat with a lock for releasably securing the seat in said horizontal position.

4. A cantilevered seat according to claim 3, wherein said latch and said latch lock each being secured to the seat at a corresponding pivot, respectively, said latch and said latch lock being biased, respectively, in rotatably opposing directions by a spring, said latch having an edge with shaped portions for engagement with legs of the latch lock, said latch having a slot for retaining a link head portion of a link in said linkage.

5. A cantilevered seat according to claim 2, wherein the fastener comprising a tab secured to the support, the tab having a bore formed therein for receiving a bolt, said bolt being carried by the linkage connecting the seat and the support.

6. A cantilevered seat according to claim 5, wherein said linkage comprising a first link with two ends, and a second link with two ends, said first link being pivotally connected underneath a seat frame at one of said ends and pivotally connected to one end of the second link at its other end.

7. A cantilevered seat according to claim 6, wherein the other end of the second link is pivotally connected to the support, and the support is a base member adapted for securing to a vehicle floorboard.

8. A cantilevered seat comprising:
   a seat with a support end and an open end;
   linkage for pivotally connecting the support end of the seat to a support, wherein said seat is movable relative to the support between a vertical stowable position and a horizontal position;
   a seat back with opposite ends, said seat back is pivotally secured to the seat so that the seat back is movable relative to the seat between a lowered position and a raised position; and
   a pin lock and slot assembly for releasably securing the seat back in the raised position, said pin lock and slot assembly comprising pivot arms secured to the ends of the seat at a pivot, a retention pin and a lock pin, a retention slot located at each end of the seat back, the retention pin being a single pin connecting the pivot arms.

9. A seat according to claim 8, further comprising a latch and lock assembly for releasably securing the seat in the horizontal position, said latch and lock assembly comprising a latch and a latch lock each being mounted to the seat at a respective pivot, said latch and said latch lock each being biased, respectively, by a spring for rotational movement in a direction that opposes the direction of the other, said latch having an edge with shaped portions for engagement with legs of the latch lock, said latch having a slot for retaining a link head portion of a link in said linkage.

10. A seat according to claim 8, further comprising a latch slot located at each end of the seat back for receiving said lock pin for locking the seat back in said raised position.

11. A seat according to claim 10, wherein the pivot arm includes a spring for constantly urging the pivot arm in a rotationally upward direction relative to the seat.

12. A seat according to claim 11, further comprising a frame plate having an upper cam slot formed therein, a cam pin carried by the seat back for traveling within the cam slot when the seat back moves between said lowered and raised positions, a lower cutout formed in the frame plate for permitting travel of the retention pin when the pivot arms are rotated downward in a direction opposite to which said spring urges, said frame plate has a stop against which portions of said seat back abut when the seat back is in said lowered position and in said raised position.

* * * * *